United States Patent [19]

Reynier

[11] 3,795,892

[45] Mar. 5, 1974

[54] ASSEMBLY ARRANGEMENT FOR ELECTRODE PLATES OF ELECTROCHEMICAL GENERATORS

[75] Inventor: Jacques Reynier, Eymet, France

[73] Assignee: Saft-Societe Des Accumulateurs Fixes Et De Traction, Romainville, France

[22] Filed: Apr. 28, 1972

[21] Appl. No.: 247,447

[30] Foreign Application Priority Data
Apr. 29, 1971  France .............................. 7115364

[52] U.S. Cl. ....................... 339/244 R, 339/263 R
[51] Int. Cl. ............................................. H01r 7/08
[58] Field of Search ... 339/242, 244, 246, 248, 249, 339/263, 265, 266, 269, 271

[56] References Cited
UNITED STATES PATENTS
3,221,293  11/1965  Regan ................................ 339/242
3,192,501  6/1965   Sturdivan ........................ 339/266 F
3,651,449  3/1972   Hall et al. ....................... 339/244 R FOREIGN PATENTS OR APPLICATIONS
551,633  4/1923  France ............................... 339/242

Primary Examiner—Joseph H. McGlynn
Attorney, Agent, or Firm—Kenyon & Kenyon Reilly Carr & Chapin

[57] ABSTRACT

Electrochemical generator comprising sets of positive plates and sets of negative plates. The plates of each set are respectively interconnected and connected to at least one terminal, at the level of tabs of said plates, by cross members borne by a common shaft and tightened against one another and with a terminal element extending outwardly from the level of the shaft axis. Each cross member has a recessed lower portion on one of its faces designed when the cross members are assembled on the shaft to define spaces with the unrecessed face of the adjoining cross member so as to provide for clamping of tabs of electrode plates that are inserted into such spaces when the shaft which may be rivet-like means is riveted and tightens the assembled cross members on each shaft together.

8 Claims, 3 Drawing Figures

ASSEMBLY ARRANGEMENT FOR ELECTRODE PLATES OF ELECTROCHEMICAL GENERATORS

BRIEF SUMMARY OF INVENTION

The invention relates to electrochemical generators comprising a set of positive and a set of negative plates. In the generator positive and negative plates alternate with each other and are arranged parallel to one another. Each of the plates is provided with a tab. All positive plates are interconnected and also connected to at least one terminal element extending from the level of its said tabs by means of cross members carried by a common shaft and tightened together and with the terminal element at the level of the said shaft, by suitable means. The tabs of the negative plates are similarly interconnected and connected to at least one other terminal element.

It is already known in the art to assemble electrode plates of identical polarity by means of a shaft passing through suitable openings provided in the tabs thereof as well as in the cross members with the tightening thereof effected by use of bolts arranged at the extremities of the said shaft.

In order to be efficient, this assembly procedure requires perfect flatness and the parallel condition of all contacting surfaces, i.e., those of the tabs, the cross member and of the terminal element or terminal elements.

It is furthermore necessary that the surfaces of the cross members that bear the tabs be perpendicular to the shaft passing through them.

These conditions are not always fulfilled and, as a result zones of imperfect contact may be produced which are particularly disturbing in the case of fast discharges from the electrochemical generator.

The present invention makes it possible, in particular, to remedy these drawbacks.

An object of this invention is the provision of electrochemical generator comprising a set of positive and a set of negative plates, these plates being alternated and arranged parallel to one another, each one of said plates being provided with a tab, the positive and negative plates of each set being respectively interconnected and connected to at least one terminal element extending outwardly from the level of the said tabs of the plates thereof by means of cross members borne by a common shaft and tightened against one another and with a terminal element at the level of the said shaft by suitable means, characterized by the fact that the cross members have parallel opposite faces and at least along one face, lower recessed portions intended to provide for clamping or pinching of the tabs inserted into spaces defined between adjoining free portions of adjacent cross members effected by tightening together of said cross members on said shaft. The clamping of the tabs is effected between the extremities of the tabs and the adjoining faces of recessed and non-recessed faces of the said cross members, the cross members being in direct contact with one another and with the terminal or terminals in all regions of unrecessed portions of the said cross members borne on the shaft.

According to one characteristic of the invention, in the case of one type of cross member, the width of the space defined between adjacent members on a shaft is substantially identical to the initial thickness of the tabs of the set of plates intended to be pinched together in the space between the said cross member and an adjoining cross member or a terminal or terminals mounted on said shaft.

According to a further embodiment of the invention, at least the recessed portions of the cross members intended to effect the pinching or clamping of the tabs include curved partially cylindrical surfaces.

The pinching or clamping of the extremities of the tabs is actually achieved through a lever-like action; the tightening areas of the cross members lie between the clamping area of the extremities of the tabs and at least one line of support, forming a support zone, situated along the non-recessed portions of the cross members.

In this way, the invention makes it possible to remedy the drawbacks due to chance variation in the thickness of the tabs.

Thus, if the thickness of the tabs to be tightened between two cross members exceeds the initially provided for geometric space between adjacent cross members, the line of support between the two cross members is shifted to the upper extremities of the unrecessed portions of the cross members.

On the other hand, if the thickness of the tabs is less than the said initially provided for geometric space, this support line is shifted toward the lower extremities of the unrecessed portions of such cross members. The current from the generator using the plates interconnected in accord with this invention is transmitted mainly at the level of the pinching or clamping zones, since the possible smallness or narrowness of the surface of the support area does not impair the conductivity of the assembled unit.

Other characteristics and features of the invention will become apparent from the following description and from the annexed drawings in which.

DETAILED DESCRIPTION

Figure 1:
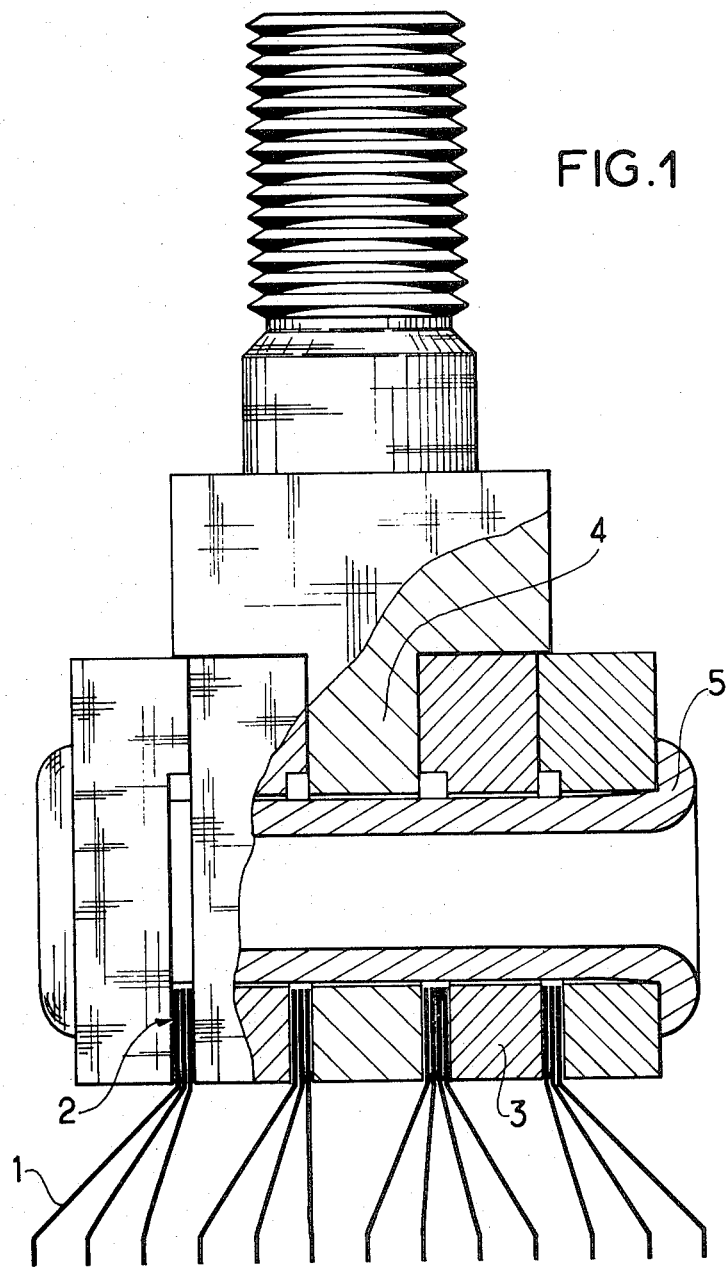
FIG. 1 is a partially cut-away profile of the upper part of an electrochemical generator embodying the invention.

Referring now to the drawings:

In FIG. 1, reference 1 designates the tabs related to electrode plates of identical polarity. The extremities 2 of such tabs are pinched or clamped between adjoining cross members or also a flat section of a terminal element 4. No holes are required in these tabs.

The cross member 3 and the terminal 4 are borne by a common shaft and tightened together at the level of the axis of said shaft by suitable means.

In the example shown, this tightening is effected by means of a rivet 5 which also constitutes the common shaft.

The tightening together of the cross member can also be effected by use of nuts screwed onto threaded extremities of a common shaft.

Figure 2:
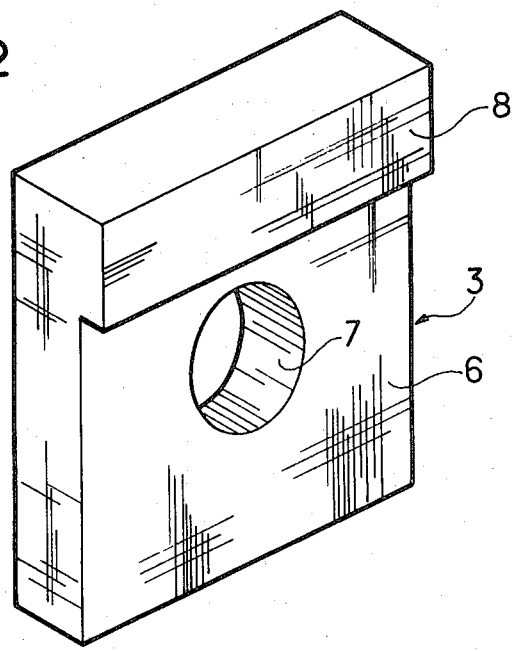
FIG. 2 is a perspective view of a cross member of FIG. 1.

FIG. 2 is a perspective view of a cross member 3 of FIG. 1.

This cross member 3 comprises along one face a lower recessed portion 6 in whose area the pinching or clamping together of the tabs of electrode plates of like polarity is to be effected.

An opening 7 is provided within the area of the recessed portion 6 for the passage therethrough of the common shaft such as rivet 5. This opening 7 which lies at the level of the tightening means, e. g. rivet 5 of the cross members and the terminal element are effective, is located in the recessed portion 6 of said cross member which is to receive the extremities of the tabs and lies below the non-recessed portion 8 of the said cross members.

The cross members 3 in assembly are in direct contact either with adjacent faces of one another like member, or with the flat portion of the terminal element 4 at the level of their non-recessed portions 8.

The depth of the recessed portion 6 of each crosspiece corresponds substantially to the thickness of the group of tabs intended to be pinched or clamped in the spaces defined between the face of the recessed portion 6 of said cross member and either an adjoining cross member, or a terminal element 4.

Figure 3:
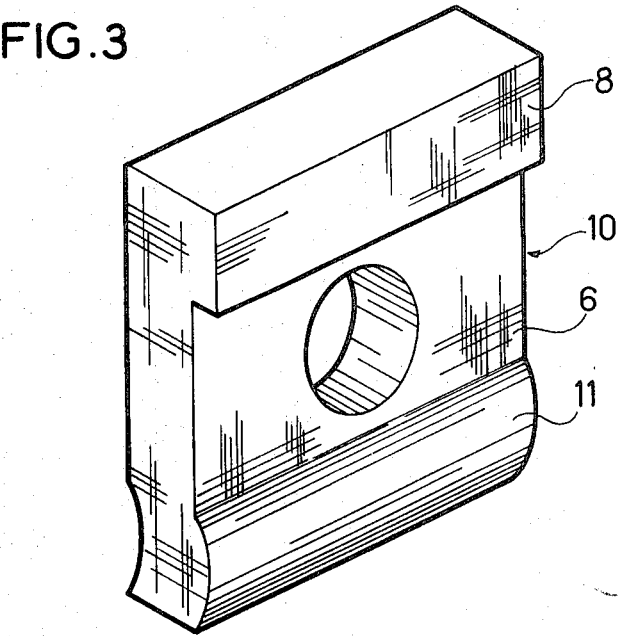
FIG. 3 represents a perspective view of another embodiment of cross member that may be used in practicing the invention.

FIG. 3 depicts another embodiment of a cross member. The cross member 10 of this figure differs solely with respect to that of FIG. 1 in that the zone 11 of the recessed portion 6 of the said cross member which is intended for effecting the pinching or clamping of the tabs has a curved partially cylindrical surface.

This embodiment thus makes it possible to improve the tightening of the extremities of the tabs of the plates by providing a spring-like action.

The manner of assembly in accordance with the invention in which the extremities of the tabs are pinched or clamped between the cross members, makes it possible, among other things, to use shorter tabs on electrode plates than in case wherein the tabs are each required to have an opening for passage through it of a common shaft in the known manner described in the hereinabove summary of invention.

It is of course understood that the invention is not limited to the embodiments described and depicted herein by way of example only. In particular, it is possible to depart from the framework of the invention within the scope of the appended claims, to make detailed changes, changes in certain arrangements, or to replace certain means by equivalent ones.

What is claimed is:

1. Connector arrangement for use in an electrochemical generator of the type comprising a set of positive plates and a set of negative plates with positive and negative plates arranged in alternation, a tab for each of said plates, the tabs of the set of positive plates being interconnected and the tabs of the set of negative plates being interconnected, a first terminal element to which said tabs of said set of positive plates are connected and a second terminal element to which said tabs of said set of negative plates are connected, said connector arrangement comprising cross members associated with each terminal, a common shaft on which said cross members and a said terminal element are mounted, means for tightening said cross members and terminal element together, said cross members each having a recess along at least one face adjacent a lower edge which respectively defines spaces with adjoining faces of next adjoining cross members or said terminal element and into which spaces the tabs of one set of said plates are received and clamped together when said cross members and terminal element are tightened together by said tightening means, said cross members and terminal element being in direct face to face contact at levels thereof other than those wherein said cross members have recesses.

2. A connector arrangement according to claim 1, wherein the depth of each recess of each cross member is such that the said spaces defined between adjacent cross members prior to tightening and tightening means is substantially identical to the thickness of the tabs to be clamped in said spaces by said tightening.

3. A connector arrangement according to claim 1, wherein at least said one face of said recess of each of the cross members has a curved, partially cylindrical surface region.

4. A connector arrangement according to claim 1, including riveting means to effect tightening together of the cross members and of the terminal element.

5. A connector arrangement according to claim 1, said shaft having threaded extremities and nuts mounted on said threaded extremities to effect the tightening together of the cross members and of the terminal element on said shaft.

6. For use in an electrochemical generator for clamping and interconnecting tabs of electrode plates of like polarity, cross members each having parallel surfaces, one of said surfaces being provided with a recessed portion, a common shaft and a terminal element, and each member having an opening in its recessed portion and said terminal element having an opening to permit abutting assembly together of such cross members and said terminal element on said common shaft, the recessed portions of said members then defining an electrode tab receiving space with a face of an adjoining cross member, and means for tightening said assembly of cross members and terminal element together on said shaft with electrode tabs positioned in each such space and thereby effect clamping of such tabs in such space.

7. For use in an electrochemical generator according to claim 6, the said cross members each having a curved partially cylindrical area in its recessed portion.

8. Connector arrangement for use in an electrochemical generator, said generator comprising a set of positive and a set of negative plates, said plates being alternated and arranged in parallel, positive and negative plates being respectively interconnected and connected via a connector arrangement to at least one terminal element, the arrangement comprising cross members and a common shaft bearing said cross members and the corresponding terminal element and means for tightening said cross members together and with the said corresponding terminal elements along said shaft, said cross members having located along at least one face lower recessed portions for providing clamping space for the tabs between faces of recessed portions of said cross space members and the next adjacent cross members or said terminal element upon tightening of the cross members, said cross members being in direct contact with one another, or with the terminal element, at the levels of their unrecessed portions.

* * * * *